(12) United States Patent  (10) Patent No.: US 8,497,917 B2
Ku  (45) Date of Patent: Jul. 30, 2013

(54) IMAGE STABILIZATION SYSTEM

(75) Inventor: Ping-Han Ku, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 12/981,500

(22) Filed: Dec. 30, 2010

(65) Prior Publication Data

US 2012/0140087 A1  Jun. 7, 2012

(30) Foreign Application Priority Data

Dec. 6, 2010 (TW) ................. 99142269 A

(51) Int. Cl.
*H04N 5/228* (2006.01)
*G03B 17/00* (2006.01)

(52) U.S. Cl.
USPC ..................... 348/208.99; 396/55

(58) Field of Classification Search
USPC ..................... 348/208.99; 396/55
See application file for complete search history.

(56) References Cited

U.S. PATENT DOCUMENTS

| 2006/0033818 A1* | 2/2006 | Wada et al. ............. 348/208.11 |
| 2007/0070448 A1* | 3/2007 | Jung et al. .................... 358/482 |
| 2010/0091120 A1* | 4/2010 | Nagata et al. ............. 348/208.4 |
| 2011/0103782 A1* | 5/2011 | Tsuruta et al. ................. 396/55 |

\* cited by examiner

*Primary Examiner* — Aung S Moe
*Assistant Examiner* — Mekonnen Dagnew
(74) *Attorney, Agent, or Firm* — Altis Law Group, Inc.

(57) ABSTRACT

An image stabilization system includes a fixed unit having a first receiving cavity therein, a movable unit received in the first receiving cavity, a pivot member located between the fixed unit and the movable unit, a magnetic motion sensor, and a magnetic driving module. The pivot member is received in and between the fixed unit and the movable unit. The magnetic motion sensor is disposed on the fixed unit for detecting a movement of the image stabilization system. The magnetic driving module is configured for rotating the movable unit around the pivot member to compensate for movement of the image stabilization system based on the motion detection result of the motion sensor.

8 Claims, 5 Drawing Sheets

IMAGE STABILIZATION SYSTEM

BACKGROUND

1. Technical Field

The present disclosure relates to camera systems, and particularly to an image stabilization system.

2. Description of Related Art

In normal use of a camera, light from an object enters the camera and is incident upon a particular region of an image sensor. The image sensor forms an optical image associated with the object at a first position.

However, vibration from hand-held shooting can result in light from the object reaching a different region of the image sensor, causing blur. Current image stabilization systems that deal with this problem are expensive and complicated.

Therefore, an image stabilization system is desired to overcome the described limitations.

DETAILED DESCRIPTION

Embodiments will now be described in detail below with reference to drawings.

Figure 1:
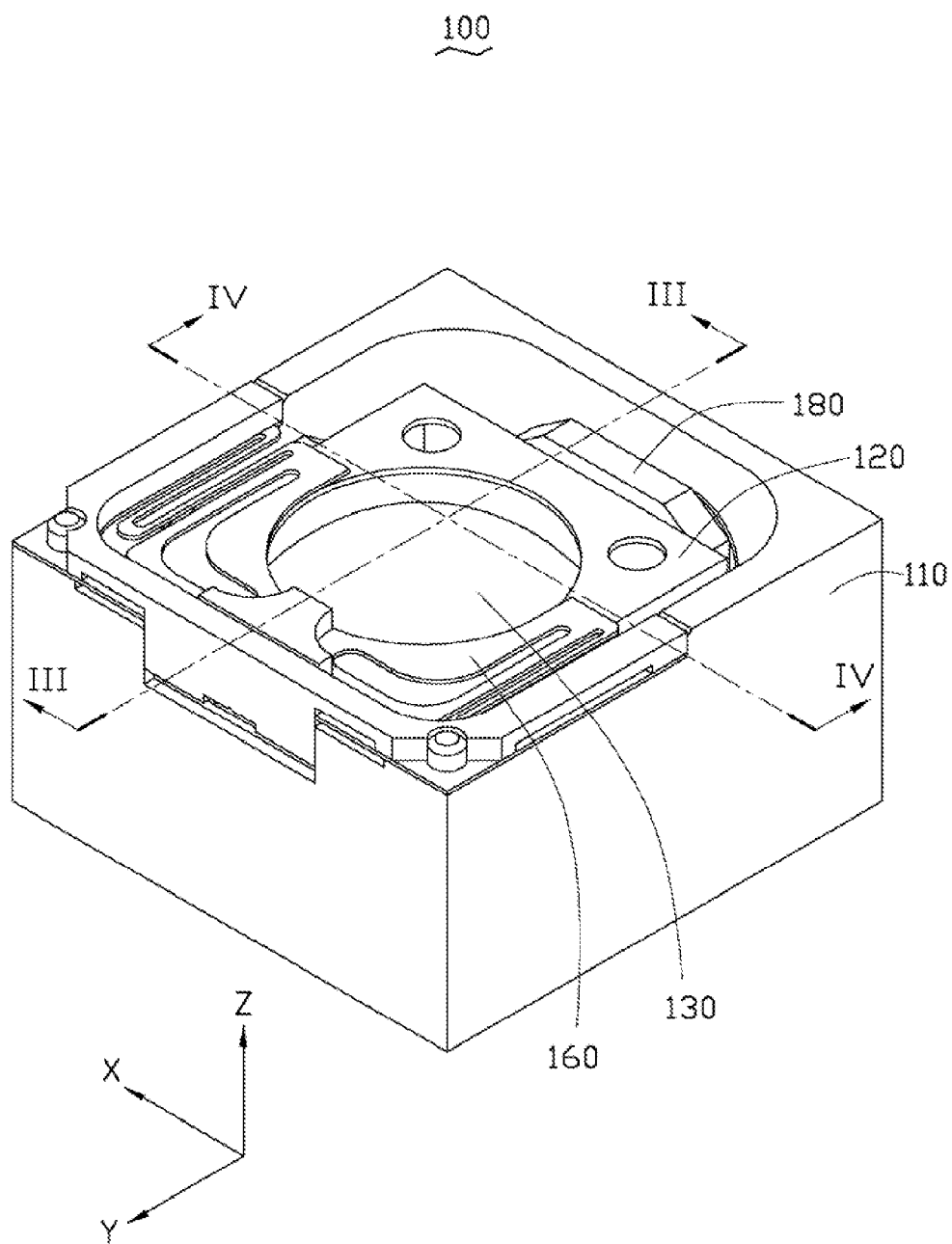
FIG. 1 is an isometric view of an image stabilization system according to an exemplary embodiment.
Figure 2:
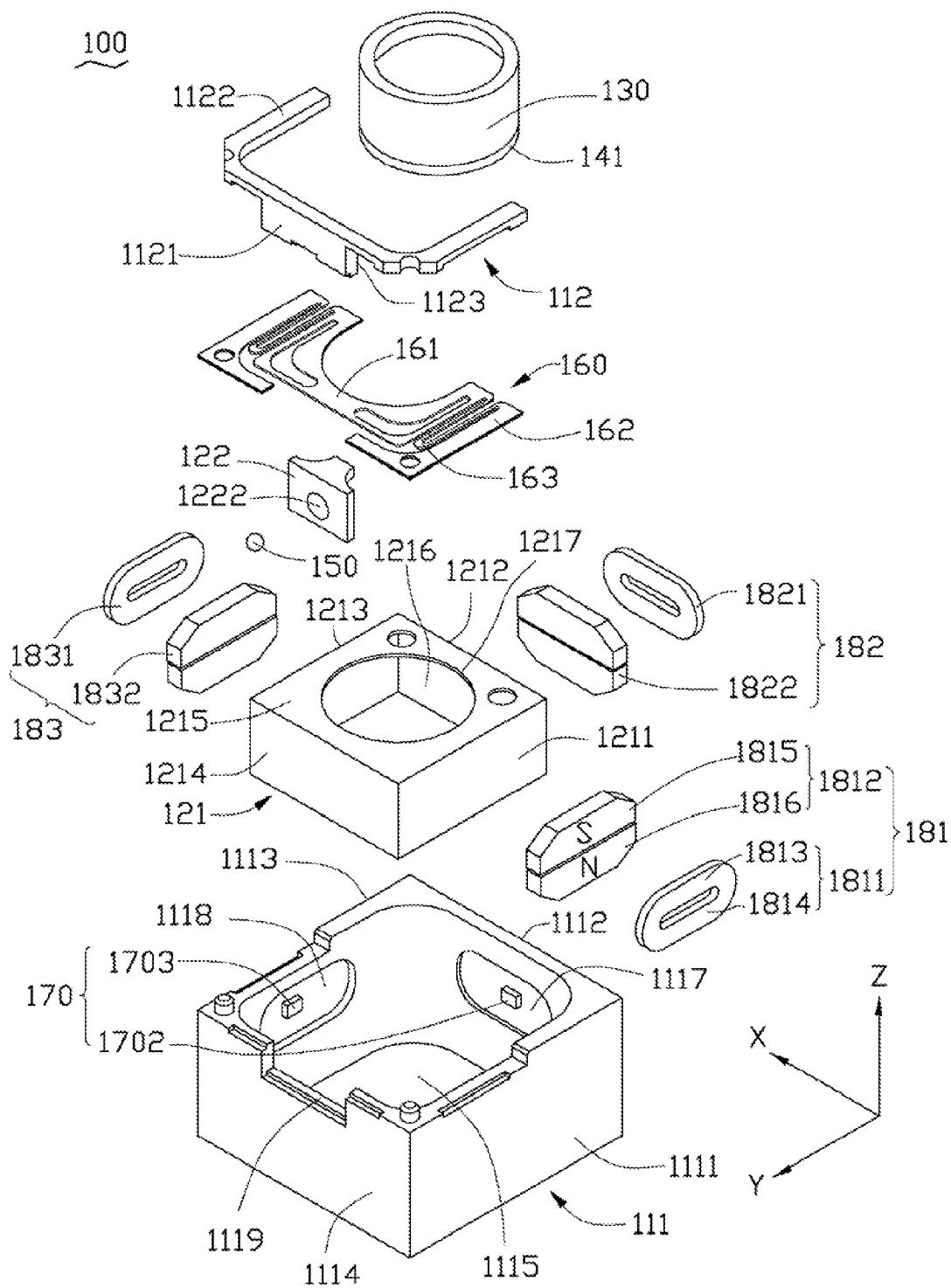
FIG. 2 is an exploded and isometric view of the stabilizing camera system of FIG. 1.
Figure 3:
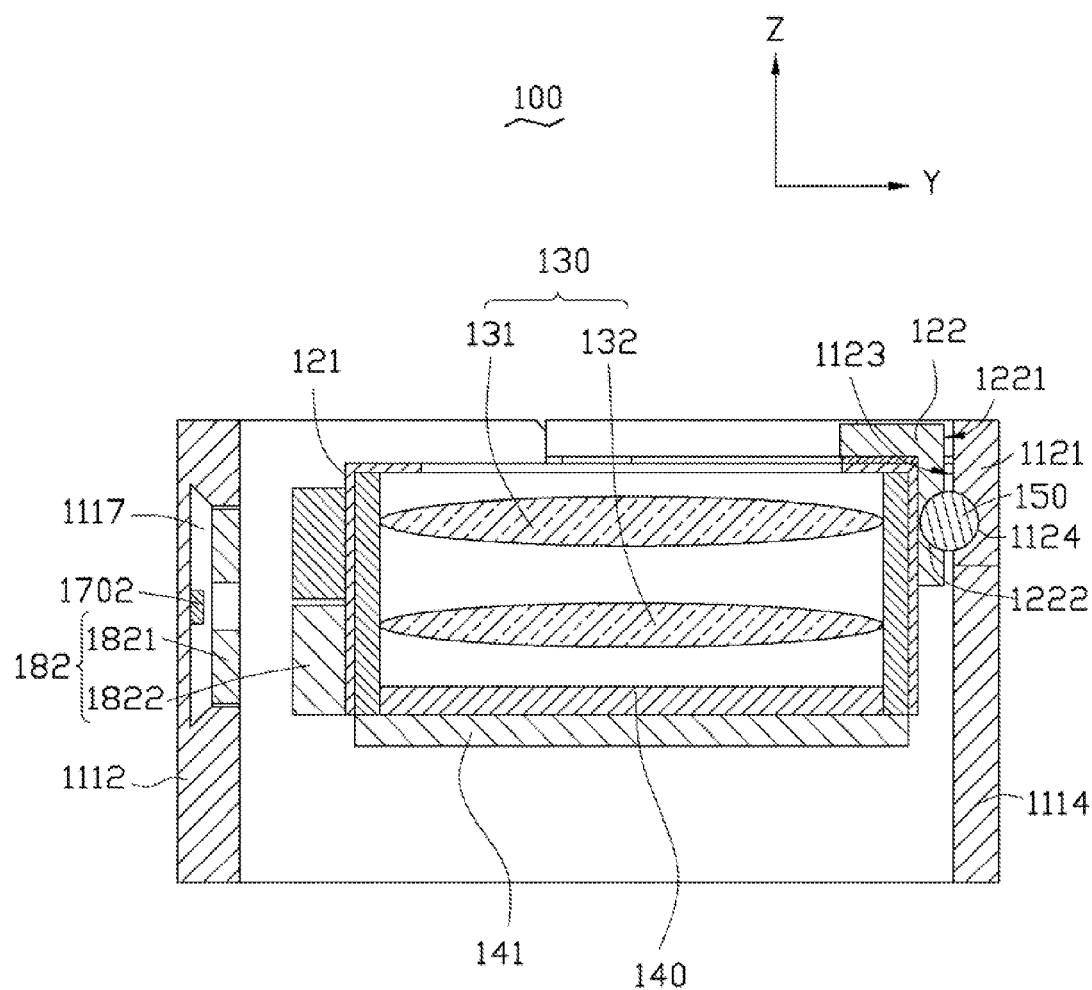
FIG. 3 is a cross-section of the stabilization system of FIG. 1, taken along a line III-III thereof.
Figure 4:
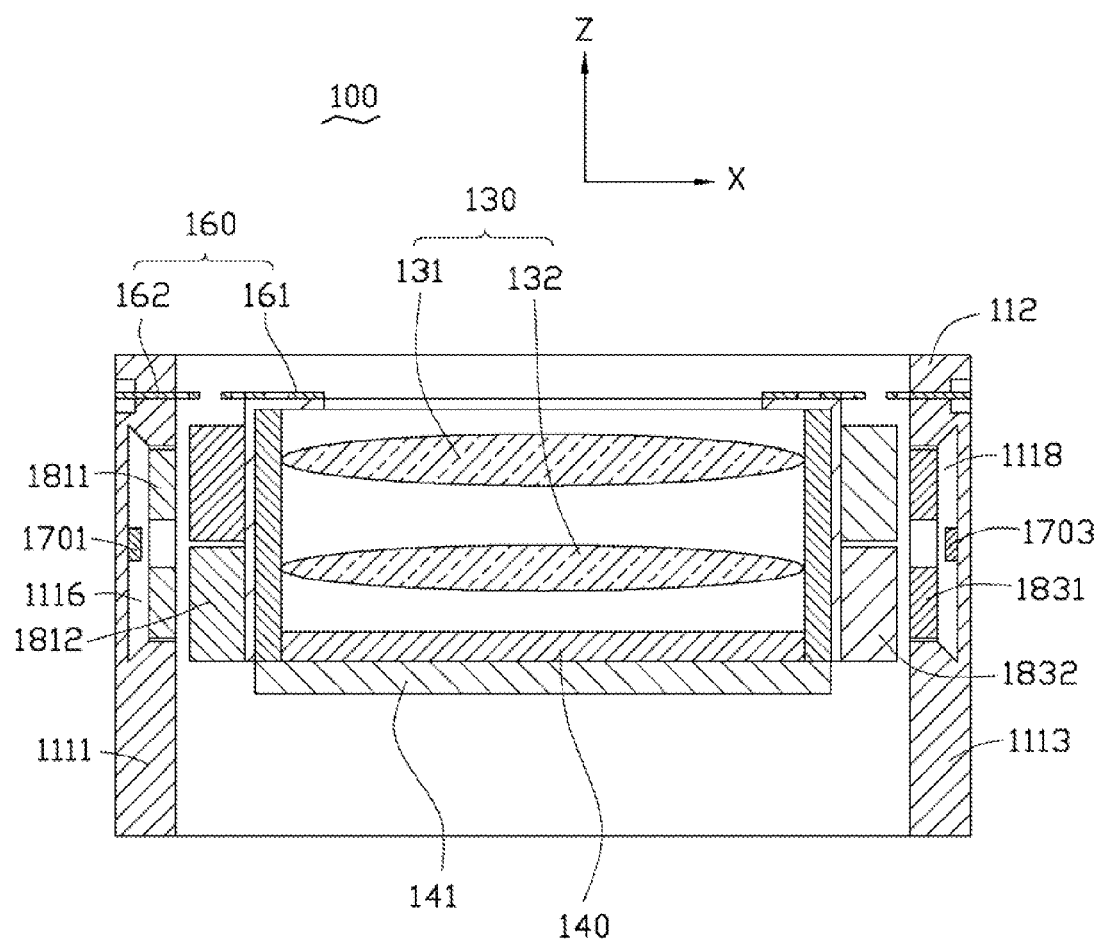
FIG. 4 is a cross-section of the stabilization system of FIG. 1, taken along a line IV-IV thereof.
Figure 5:
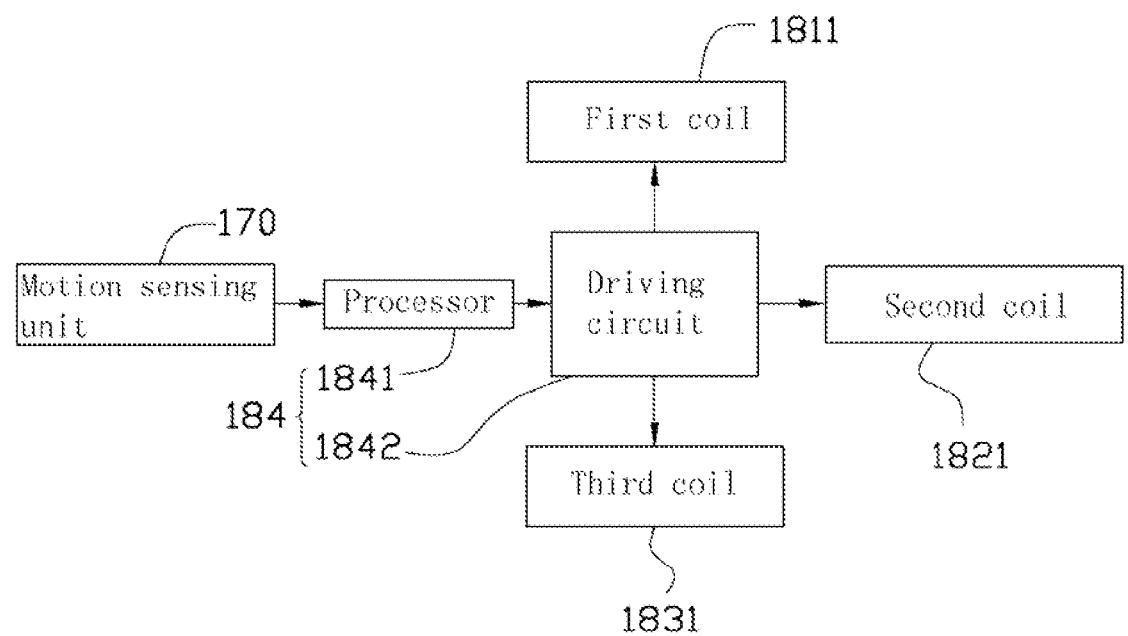
FIG. 5 is a block diagram showing a relationship between a motion sensing unit, a first coil, a second coil, and a third coil of the stabilization system of FIG. 1.

Referring to FIGS. 1-5, an image stabilizing system 100, in accordance with an exemplary embodiment, and shown. The system 100 includes a fixed unit 110, a movable unit 120, a lens module 130, an image sensor 140, a pivot member 150, an elastic member 160, a motion sensing unit 170, and a magnetic driving module 180.

The fixed unit 110 is substantially cubic. The fixed unit 110 is securely mounted on a main body (not shown) of the system 100. The fixed unit 110 includes a main frame 111 and an attachable frame 112.

The main frame 111 is substantially cubic, and includes a first sidewall 1111, a second sidewall 1112, a third sidewall 1113 opposite to the first sidewall 1111, and a fourth sidewall 1114 opposite to the second sidewall 1112. The four sidewalls 1111, 1112, 1113, and 1114 cooperatively define a first receiving cavity 1115 for receiving the movable unit 120 therein. The first sidewall 1111 defines a first receiving recess 1116 communicating with the first receiving cavity 1115. The second sidewall 1112 defines a second receiving recess 1117 communicating with the first receiving cavity 1115. The third sidewall 1113 defines a third receiving recess 1118 communicating with the first receiving cavity 1115. An upper end surface of the fourth sidewall 1114 defines a recess 1119 for receiving the attachable frame 112. In other embodiments, the fixed unit 110 may alternatively be of other shapes, such as cylindrical, pentagonal prismatic, or others.

The attachable frame 112 is substantially U-shaped and configured for receiving the pivot member 150 therein. The attachable frame 112 includes a vertical plate 1121, and a U-shaped plate 1122 perpendicular to the side plate 1121.

The plate 1121 is securely mounted in the recess 1119. The plate 1121 has an inner surface 1123 facing the first receiving cavity 1115. The inner surface 1123 defines a first receiving portion 1124 (see FIG. 3) for receiving the pivot member 150 therein. The three sides of the plate 1122 are securely mounted on the top surfaces of the first, third, and fourth sidewalls 1111, 1113, and 1114, respectively. In the present embodiment, the first receiving portion 1124 is a recess. In alternative embodiments, the first receiving portion 1124 may be a through hole. In further alternative embodiments, the pivot member 150 may alternatively be partially received in the fourth sidewall 1114. In such case, the recess 1119 and the plate 1121 may be omitted.

The movable unit 120 is substantially cubic, and received in the first receiving cavity 1115. The movable unit 120 is configured for receiving the lens module 130 therein. The movable unit 120 includes a movable frame 121, and a receiving member 122 securely mounted on the movable frame 121.

The movable frame 121 is substantially cubic, and includes a first side plate 1211, a second side plate 1212, a third side plate 1213 opposite to the first side plate 1211, a fourth side plate 1214 opposite to the second side plate 1212, and a top plate 1215. The top plate 1215 is substantially square, and is perpendicular to the four plates 1211, 1212, 1213, and 1214. The four plates 1211, 1212, 1213, and 1214, and the top plate 1215 cooperatively define a second receiving cavity 1216 for receiving the lens module 130 therein. The top plate 1215 defines a through hole 1217 at the center thereof. The through hole 1217 allows light to pass the top plate 1215 and enter the second receiving cavity 1216. In other embodiments, the movable unit 120 may alternatively be any other shape, such as cylindrical, pentagonal prismatic etc.

The receiving member 122 is configured for partially receiving the pivot member 150 therein, thereby cooperating with the attachable frame 112 to receive the pivot member 150. The receiving member 122 is disposed between the vertical plate 1121 and the fourth side plate 1214, and is spaced from the vertical plate 1211. The receiving member 122 has an outer surface 1221 (see FIG. 3) facing the inner surface 1123. The outer surface 1221 defines a second receiving portion 1222 for partially receiving the pivot member 150 therein. In the present embodiment, the second receiving portion 1222 is a recess. In other embodiments, the second receiving portion 1222 may be a through hole, or even omitted, in which case the pivot member 150 can be partially received in the fourth side plate 1214 therein.

The lens module 130 is securely mounted in the movable frame 121. The lens module 130 includes a lens 131 (see FIG. 3), a lens 132, and an actuator (not shown) for focusing and/or zooming. In the present embodiment, the actuator may drive the lens 131 relative to the lens 132 for zooming. In other embodiments, the actuator may drive the lens 131 and the lens 132 relative to the image sensor 140 for focusing.

The image sensor 140 is electrically connected to a printed circuit board 141 securely mounted on the bottom end of the lens module 130, and is surrounded by the movable frame 121. The image sensor 140 is configured for converting an optical image to an electrical signal. In other embodiments, the printed circuit board 141 may alternatively be securely mounted on the bottom of the main frame 111.

The pivot member 150 is received in and between the first receiving portion 1124 and the second receiving portion 1222, such that the movable frame 121, driven by the driving module 180, can rotate around the pivot member 150 relative to the main frame 111. In the present embodiment, the pivot member 150 is a ball, and the movable unit 130 can rotate around both the X and Y axes. In other embodiments, the pivot member 150 may alternatively be a shaft, such that the movable unit 130 can rotate only around one axis.

The elastic member 160 is configured for providing an elastic restoring force to make the movable unit 120 coaxial to the fixed unit 110. The elastic member 160 is disposed between the main and attachable frames 111, 112. The elastic member 160 includes a first fixed portion 161, a second fixed portion 162, and an elastic connecting portion 163 connecting the first fixed portion 161 to the second fixed portion 162. The first fixed portion 161 is, for example, adhesively mounted on top surface of the top plate 1215. The second fixed portion 162 is securely mounted on the top surfaces of the first, third and fourth sidewalls 1111, 1113, 1114, thereby interposing the elastic connecting portion 163 between the fixed unit 110 and the movable unit 120. In alternative embodiments, the second fixed portions 162 may alternatively be securely adhered on the top surface of the U-shaped plate 1122. In other alternative embodiments, the elastic member 160 may alternatively be a spring. In such case, the number of the elastic member 160 may be two, three, or more.

The motion sensing unit 170 is configured for sensing a movement of the movable unit 120 relative to the fixed unit 110. The motion sensing unit 170 includes a first magnetic motion sensor 1701 mounted on the bottom of the recess 1116, a second magnetic motion sensor 1702 mounted on the bottom of the recess 1117, and a third magnetic motion sensor 1703 mounted on the bottom of the recess 1118. The first magnetic motion sensor 1701 and the third magnetic motion sensor 1703 are configured for sensing a movement of the movable unit 120 relative to the fixed unit 110 along the Y axis. The second magnetic motion sensor 1702 is configured for sensing a movement of the movable unit 120 relative to the fixed unit along the X axis. In the present embodiment, the first, second, and third magnetic motion sensors 1701, 1702, and 1703 are magnetic resistance sensors. In alternative embodiments, the first, second, and third magnetic motion sensors 1701, 1702, and 1703 may be hall sensors. In further alternative embodiments, the first, second, and third magnetic motion sensors 1701, 1702, and 1703 may be respectively mounted on the inner surfaces of the first, second, and third sidewalls 1111, 1112, and 1113.

The driving module 180 is configured for rotating the lens module 130 relative to the main frame 111 to compensate for movements of the system 100 based on/associated with motion detection result/signals of the motion sensing unit 170, thereby eliminating/reducing blur from vibration. The driving module 180 includes a first electromagnetic driving unit 181, a second electromagnetic driving unit 182, a third electromagnetic driving unit 183, and a control circuit 184.

The first electromagnetic driving unit 181 is configured for rotating the lens module 130 around a Y axis relative to the main frame 111. The first electromagnetic driving unit 181 includes a first coil 1811 received in the recess 1116 and over the first magnetic motion sensor 1701, and a first magnet group 1812 securely mounted on the outer surface of the first side plate 1211.

The first coil 1811 is opposite to the first magnet group 1812 and electrically connected with the control circuit 184, thereby making the control circuit 184 control current flowing in the first coil 1811. Accordingly, a magnetic force generated between the first coil 1811 and the first magnet group 1812 can be controlled by the control circuit 184. The first coil 1811 includes an upper portion 1813 and a lower portion 1814.

The first magnet group 1812 for generating a magnetic field is opposite to the first magnetic motion sensor 1701, whereby the first magnetic motion sensor 1701 senses a change of the magnetic field generated by the first magnet group 1812, which is caused by a movement of the movable frame 121 relative to the main frame 111. That is, when the first magnet group 1812 moves with the movable frame 121 relative to the main frame 111, the first magnetic motion sensor 1701 detects a change of the magnetic field generated by the first magnet group 1812, and then senses a movement of the movable frame 121 relative to the main frame 111 along the Y axis.

The first magnet group 1812 includes an upper magnet 1815 spatially corresponding to the upper portion 1813, and a lower magnet 1816 spatially corresponding to the lower portion 1814. The S magnetic pole of the upper magnet 1815 faces away from the first side plate 1211, and the N magnetic pole of the upper magnet 1815 faces the first side plate 1211 or vice versa in other embodiments. The N magnetic pole of the lower magnet 1816 faces away from the first side plate 1211, and the S magnetic pole of the lower magnet 1816 faces the first side plate 1211 or vice versa in other embodiments.

The second electromagnetic driving unit 182 is configured for rotating the lens module 130 around the X axis relative to the main frame 111, and is similar to the first electromagnetic unit 181. The second electromagnetic driving unit 182 includes a second coil 1821 received in the recess 1117 and over the second magnetic motion sensor 1702, and a second magnet group 1822 securely mounted on the second side plate 1212.

The second coil 1821 is opposite to the second magnet group 1822 and electrically connected with the control circuit 184.

The second magnet group 1822 is opposite to the second magnetic motion sensor 1702, whereby the second magnetic motion sensor 1702 senses a change of the magnetic field generated by the second magnet group 1822, which is caused by a movement of the movable frame 121 relative to the main frame 111. That is, when the second magnet group 1822 moves with the movable frame 121 relative to the main frame 111, the second magnetic motion sensor 1702 detects a change of the magnetic field generated by the second magnet group 1822, and then senses a movement of the movable frame 121 relative to the main frame 111 along the X axis.

The third electromagnetic driving unit 183 is configured for rotating the lens module 130 around the Y axis relative to the main frame 111, and is similar to the first electromagnetic unit 181. The third electromagnetic driving unit 183 includes a third coil 1831 received in the recess 1118 and over the third magnetic motion sensor 1703, and a third magnet group 1832 securely mounted on the third side plate 1213.

The third coil 1831 is opposite to the third magnet group 1832, and electrically connected with the control circuit 184.

The third magnet group 1832 is opposite to the third magnetic motion sensor 1703, whereby the third magnetic motion sensor 1703 senses a change of a magnetic field generated by the third magnet group 1832, which is caused by the movable frame 121 relative to the main frame 111. That is, when the third magnet group 1832 moves with the movable frame 121 relative to the main frame 111, the third magnetic motion sensor 1703 detects a change of the magnetic field generated by the third magnet group 1832, and then senses a movement of the movable frame 121 relative to the main frame 111 along the Y axis.

The control circuit 184 includes a processor 1841 and a driving circuit 1842 electrically connected to the processor 1841. The processor 1841 is electrically connected to the motion sensing unit 170. The driving circuit 1842 is electrically connected to the first coil 1811, the second coil 1821, and the third coil 1831. The processor 1841 can be, for example, a digital signal processor (DSP) position controller.

In operation, when starting an image capture with the system 100, the elastic member 160 is in a normal state; and no power is supplied to the first coil 1811, the second coil 1821, and the third coil 1831. At this moment, the system 100 forms an image associated with an object (not shown) on a first position of the image sensor 140.

During image capture, vibration may cause, for example, the image sensor 140 and the lens module 130 to rotate clockwise around the Y axis relative to the main frame 111. The motion sensing unit 170 detects a movement of lens module 130 and sends a motion detection result to the processor 1841. Based on the motion detection result, the processor 1841 computes a compensating adjustment for the lens module 130 in order to reposition the image on the first position of the image sensor 140. For example, the computed compensating angle may require the lens module 130 to rotate counterclockwise around the Y axis a certain degree. The processor 1841 then sends a signal to the driving circuit 1842, and the driving circuit 1842 applies power to the first coil 1811 in response to the signal, such that the first magnet group 1812 (i.e. the movable frame 121) driven by magnetic force, rotates clockwise around the Y axis.

Hence, the movable unit 120 together with the lens module 130 is rotated counterclockwise the predetermined angle around the Y axis, and the elastic connecting portion 163 becomes stretched. As a result, the system 100 forms an image associated with the object (not shown) on the first position of the image sensor 140 and vibration is compensated for. In addition, the driving module 180 of the system 100 applies magnetic force to drive the movable unit 20 around the pivot member 150, and control of the magnetic forces is easier. Cost of the system 100 is minimized, and because each magnet group corresponds to a magnetic motion sensor, the motion sensing unit 170 can precisely sense the movement of the movable unit 120.

After capturing the stabilized image of the object, even though the driving circuit 1842 may stop supplying power to the first coil 1811, the elastic restoring forces generated by the deformation of the elastic connecting portion 163 can drive the movable unit 120 to be coaxial to the fixed unit 110.

It is to be understood that when the system 10 vibrates, the system 100 may be only rotated around the X axis. In such circumstances, the second coil 1821 should and can be activated to adjust the position of the movable unit 120.

It is also to be understood that when the system 10 vibrates, the system 100 may be rotated around both the X axis and the Y axis. In these circumstances, the first coil 1811, the second coil 1821, and the third coil 1831 are activated to adjust a position of the movable unit 120.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. An image stabilization system comprising:
    a fixed unit, the fixed unit having a first receiving cavity therein and an inner surface in the first receiving cavity, the inner surface having a first receiving portion, the first receiving portion being a recess or a through hole;
    a movable unit received in the first receiving cavity, the movable unit having an outer surface facing the inner surface, the outer surface having a second receiving portion, the movable unit comprising a movable frame and a receiving member mounted on the movable frame, the second receiving portion being defined in the receiving member;
    a pivot member located between the fixed unit and the movable unit, the pivot member being received in and between the first receiving portion and the second receiving portion;
    a magnetic sensor disposed on the fixed unit;
    a magnetic driving module, the magnetic driving module comprising a magnet group mounted on the movable unit, the magnet group being opposite to the magnetic sensor, the magnetic sensor configured for detecting a change of a magnetic field generated by the magnet group due to a movement of the movable unit relative to the fixed unit, the magnetic driving module configured for driving the movable unit to rotate around the pivot member to compensate the movement of the movable unit based on a motion detection result of the magnetic sensor, wherein the fixed unit comprises a main frame and an attachable frame, the main frame is substantially cubic, and comprises a first sidewall, a second sidewall, a third sidewall opposite to the first sidewall, and a fourth sidewall opposite to the second sidewall, the first, second, third, and fourth sidewalls cooperatively define the first receiving cavity for receiving the movable unit therein, the first sidewall defines a first receiving recess communicating with the first receiving cavity, the second sidewall defines a second receiving recess communicating with the first receiving cavity, the third sidewall defines a third receiving recess communicating with the first receiving cavity, and an upper end surface of the fourth sidewall defines a recess for receiving the attachable frame, the attachable frame is substantially U-shaped and configured for receiving the pivot member therein, the attachable frame comprises a vertical plate, and a U-shaped plate perpendicular to the side plate, the plate is securely mounted in the recess, the plate has an inner surface facing the first receiving cavity, the inner surface defines the first receiving portion for receiving the pivot member therein, and the three sides of the plate are securely mounted on the top surfaces of the first, third, and fourth sidewalls, respectively.

2. The image stabilization system of claim 1, wherein the receiving member cooperates with the attachable frame to receive the pivot member, the receiving member is disposed between the vertical plate and the fourth side plate, and is spaced from the vertical plate, the receiving member has an outer surface facing the inner surface, and the outer surface defines the second receiving portion for partially receiving the pivot member therein.

3. The image stabilization system of claim 1, further comprising an elastic member for providing an elastic restoring force, the elastic member is interposed between the fixed unit and the movable unit, wherein the elastic member is disposed between the main and attachable frames, the elastic member comprise a first fixed portion, a second fixed portion, and an elastic connecting portion connecting the first fixed portion to the second fixed portion, the first fixed portion is mounted on top surface of the top plate, the second fixed portion is securely mounted on the top surfaces of the first, third and fourth sidewalls, thereby interposing the elastic connecting portion between the fixed unit and the movable unit.

4. The image stabilization system of claim 1, wherein the motion sensing unit comprises a first magnetic motion sensor mounted on the bottom of the first receiving recess of, a second magnetic motion sensor mounted on the bottom of the second receiving recess, and a third magnetic motion sensor mounted on the bottom of the third receiving recess.

5. An image stabilization system for capturing an image of an object, the image stabilization system comprising:

a fixed unit, the fixed unit having a first receiving cavity therein and an inner surface in the first receiving cavity, the inner surface having a first receiving portion, the first receiving portion being a recess or a through hole;

a movable unit received in the first receiving cavity, the movable unit having an outer surface facing the inner surface, the outer surface having a second receiving portion, the movable unit comprising a movable frame and a receiving member mounted on the movable frame, the second receiving portion being defined in the receiving member;

an image sensor received in the fixed unit;

a pivot member located between the fixed unit and the movable unit, the pivot member being received in and between the first receiving portion and the second receiving portion;

a magnetic sensor disposed on the fixed unit;

a magnetic driving module, the magnetic driving module comprising a magnet group mounted on the movable unit, the magnet group being capable of generating a magnetic field, the magnetic sensor configured for sensing a change of the magnetic field due to a movement of the movable unit relative to the fixed unit, the magnetic driving module configured for driving the movable unit to rotate around the pivot member to relative to the fixed unit based on a motion detection result of the magnetic sensor, such that the image stabilization system can form an image of the object on an identical position of the image sensor before and after a shake of the image stabilization system, wherein the fixed unit comprises a main frame and an attachable frame, the main frame is substantially cubic, and comprises a first sidewall, a second sidewall, a third sidewall opposite to the first sidewall, and a fourth sidewall opposite to the second sidewall, the first, second, third, and fourth sidewalls cooperatively define the first receiving cavity for receiving the movable unit therein, the first sidewall defines a first receiving recess communicating with the first receiving cavity, the second sidewall defines a second receiving recess communicating with the first receiving cavity, the third sidewall defines a third receiving recess communicating with the first receiving cavity, and an upper end surface of the fourth sidewall defines a recess for receiving the attachable frame, the attachable frame is substantially U-shaped and configured for receiving the pivot member therein, the attachable frame comprises a vertical plate, and a U-shaped plate perpendicular to the side plate, the plate is securely mounted in the recess, the plate has an inner surface facing the first receiving cavity, the inner surface defines the first receiving portion for receiving the pivot member therein, and the three sides of the plate are securely mounted on the top surfaces of the first, third, and fourth sidewalls, respectively.

6. The image stabilization system of claim 5, wherein the receiving member cooperates with the attachable frame to receive the pivot member, the receiving member is disposed between the vertical plate and the fourth side plate, and is spaced from the vertical plate, the receiving member has an outer surface facing the inner surface, and the outer surface defines the second receiving portion for partially receiving the pivot member therein.

7. The image stabilization system of claim 5, further comprising an elastic member for providing an elastic restoring force, the elastic member is interposed between the fixed unit and the movable unit, wherein the elastic member is disposed between the main and attachable frames, the elastic member comprise a first fixed portion, a second fixed portion, and an elastic connecting portion connecting the first fixed portion to the second fixed portion, the first fixed portion is mounted on top surface of the top plate, the second fixed portion is securely mounted on the top surfaces of the first, third and fourth sidewalls, thereby interposing the elastic connecting portion between the fixed unit and the movable unit.

8. The image stabilization system of claim 5, wherein the motion sensing unit comprises a first magnetic motion sensor mounted on the bottom of the first receiving recess of, a second magnetic motion sensor mounted on the bottom of the second receiving recess, and a third magnetic motion sensor mounted on the bottom of the third receiving recess.

* * * * *